United States Patent
Li (10) Patent No.: US 11,294,735 B2
(45) Date of Patent: Apr. 5, 2022

(54) METHOD AND APPARATUS FOR ACCESSING DESKTOP CLOUD VIRTUAL MACHINE, AND DESKTOP CLOUD CONTROLLER

(71) Applicant: Huawei Technologies Co., Ltd., Shenzhen (CN)

(72) Inventor: Mingdeng Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 169 days.

(21) Appl. No.: 16/805,255

(22) Filed: Feb. 28, 2020

(65) Prior Publication Data

US 2020/0201686 A1  Jun. 25, 2020

Related U.S. Application Data

(63) Continuation of application No. PCT/CN2018/076902, filed on Feb. 14, 2018.

(30) Foreign Application Priority Data

Aug. 30, 2017  (CN) .......................... 201710765533.2

(51) Int. Cl.
*G06F 9/50* (2006.01)
*G06F 9/455* (2018.01)

(52) U.S. Cl.
CPC ........ *G06F 9/5083* (2013.01); *G06F 9/45558* (2013.01); *G06F 9/505* (2013.01); *G06F 2009/4557* (2013.01); *G06F 2009/45595* (2013.01)

(58) Field of Classification Search
CPC .... G06F 9/5083; G06F 9/45558; G06F 9/505; G06F 2009/4557; G06F 2009/45595; G06F 9/54; G06F 9/452; H04L 67/08; H04L 67/10; H04L 67/32
See application file for complete search history.

(56) References Cited

U.S. PATENT DOCUMENTS

2016/0088068 A1* 3/2016 Toy ...................... H04L 67/1097
709/219

FOREIGN PATENT DOCUMENTS

| CN | 101651743 A | 2/2010 |
|---|---|---|
| CN | 102404316 A | 4/2012 |
| CN | 103220359 A | 7/2013 |
| WO | 2013056228 A1 | 4/2013 |

* cited by examiner

*Primary Examiner* — Sisley N Kim
(74) *Attorney, Agent, or Firm* — Conley Rose, P.C.

(57) ABSTRACT

A desktop cloud virtual machine access method includes receiving, by a desktop cloud controller, an access request from a desktop cloud client, where a target virtual machine (VM) specified in the access request is deployed on a target computing node, and then, when determining that a target virtual access gateway (VAG) is deployed on the target computing node, instructing, by the desktop cloud controller, the desktop cloud client to establish communication with the target virtual machine using the target virtual access gateway.

17 Claims, 4 Drawing Sheets

METHOD AND APPARATUS FOR ACCESSING DESKTOP CLOUD VIRTUAL MACHINE, AND DESKTOP CLOUD CONTROLLER

CROSS-REFERENCE TO RELATED APPLICATION

This application is a continuation of International Patent Application No. PCT/CN2018/076902, filed on Feb. 14, 2018, which claims priority to Chinese Patent Application No. 201710765533.2 filed on Aug. 30, 2017. The disclosures of the aforementioned applications are hereby incorporated by reference in their entireties.

TECHNICAL FIELD

This application relates to the field of information technologies, and in particular, to a method and an apparatus for accessing a desktop cloud virtual machine, and a desktop cloud controller.

BACKGROUND

In a desktop cloud, a cross-platform application program and an entire client desktop can be accessed using a thin client or any other device connected to a network. A desktop environment of a user is usually deployed at a data center of an enterprise in a centralized manner. A local terminal is usually an integrated circuit machine with a relatively low configuration, and has a common interface for connecting a display device and an input device. The local terminal has a very weak processing capability, and connects to a remote server to share a virtual machine resource in a resource pool of a virtual processor. A hosted virtual desktop provided by the desktop cloud supports access of various terminal devices. In addition, the desktop cloud provides a very flexible work processing mode for an enterprise user. Provided that there is a network, an employee can access an office environment of the enterprise through the network, to process work affairs.

In actual deployment of a desktop cloud system, because a processing capability of a single virtual access gateway (VAG) has a bottleneck, a quantity of supported virtual desktops is limited. In addition, to improve reliability and availability of the system, a plurality of VAGs are usually deployed to form a VAG cluster, and then a VAG in the VAG cluster is scheduled using a round robin algorithm, a weighted round robin algorithm, a randomized algorithm, a least connection algorithm, a source hash algorithm, or another general algorithm. This manner of scheduling using a common load balancing technology mainly has the following problems.

1. Cross-server (namely, cross-computing node) communication occurs between a VAG and a large quantity of virtual machines (VMs), resulting in heavy east-west network traffic.

2. If a server on which a VAG is located encounters a fault, the VAG and a virtual desktop VM on the server on which the VAG is located cannot normally provide services due to the server fault, and a virtual desktop VM that is on another server host and that provides an external service depending on the VAG is also affected.

SUMMARY

In view of this, this application provides a method and an apparatus for accessing a desktop cloud virtual machine, and a desktop cloud controller, to resolve a problem that there is cross-server communication between a VAG and a VM in an existing access method.

According to a first aspect, an embodiment of this application provides a method for accessing a desktop cloud virtual machine. The method includes a desktop cloud controller first receives an access request from a desktop cloud client. Because a target virtual machine specified in the access request is deployed on a target computing node, when determining that a target virtual access gateway is deployed on the target computing node, the desktop cloud controller instructs the desktop cloud client to establish communication with the target virtual machine using the target virtual access gateway.

In this way, the desktop cloud controller can select, as far as possible, a virtual access gateway located on a same computing node as the virtual machine accessed by the client. Therefore, cross-server (namely, cross-computing node) communication between VMs can be avoided to a maximum extent. This helps reduce east-west network traffic. In addition, because the virtual machine accessed by the client and the virtual access gateway are on the same computing node, even if the computing node on which the virtual access gateway is located encounters a fault, another computing node is not affected.

In a possible design, when determining that no target virtual access gateway exists on the target computing node, the desktop cloud controller determines a target virtual access gateway from a virtual access gateway cluster using an existing load balancing algorithm.

In a possible design, before the foregoing step is performed, a virtual access gateway on each computing node is first deployed in this embodiment of this application. A deployment rule is that at least one virtual access gateway is deployed on each computing node. A purpose is to ensure, as far as possible, that different virtual access gateways are allocated to different computing nodes. Then, the desktop cloud controller can preferably select the virtual access gateway located on the same computing node as the virtual machine.

In a possible design, when information about a computing node on which a VM instance runs can be obtained through an interface of a virtualized platform, the desktop cloud controller may determine, based on the target virtual machine specified in the access request, the target computing node on which the target virtual machine is located, determine a plurality of computing nodes on which a plurality of virtual access gateways are located, and when the plurality of computing nodes include the target computing node, determine the target virtual access gateway deployed on the target computing node. Certainly, when there are a plurality of virtual access gateways on the target computing node, selection is performed in these virtual access gateways using a general load balancing algorithm.

In a possible design, if the virtualized cloud platform does not have the foregoing interface, information about a computing node on which a virtual access gateway is located cannot be obtained. In this case, a mapping relationship table between each computing node and both a VM instance and a VAG instance may be preconfigured, in other words, each computing node corresponds to one mapping relationship table, and the mapping relationship table mainly reflects a correspondence between a VM and a VAG on the computing node. In this way, the desktop cloud controller first determines, based on the target virtual machine specified in the access request, the target computing node on which the target virtual machine is located, and then finds, from a mapping relationship table corresponding to the computing node, the target virtual access gateway deployed on the target computing node.

In a possible design, if the virtualized cloud platform does not have the foregoing interface, a mapping relationship table between a VM instance and a VAG instance may be directly established. A VAG instance corresponding to a VM instance and the VM are usually located on a same host. In this way, the desktop cloud controller can directly find a virtual access gateway corresponding to the target virtual machine, and use the found and determined virtual access gateway as the target virtual access gateway.

According to a second aspect, an embodiment of this application further provides an apparatus for accessing a desktop cloud virtual machine, and the apparatus has a function of implementing behavior of the desktop cloud controller in the method example in the first aspect. The function may be implemented by hardware or may be implemented by hardware executing corresponding software. The hardware or the software includes one or more modules corresponding to the foregoing function.

In a possible design, a structure of the apparatus for accessing a desktop cloud virtual machine includes a receiving unit, a processing unit, and a determining unit. These units may perform corresponding functions in the foregoing method example. For details, refer to detailed descriptions in the method example. Details are not described herein again.

According to a third aspect, an embodiment of this application further provides a desktop cloud controller, and the desktop cloud controller has a function of implementing behavior of the desktop cloud controller in the method example in the first aspect. The function may be implemented by hardware. A structure of the desktop cloud controller includes a communications interface, a processor, a bus, and a memory. The processor and the memory are connected using the bus. The processor invokes an instruction stored in the memory to execute the following processing receiving an access request from a desktop cloud client through the communications interface, and when a target virtual access gateway is deployed on the target computing node, instructing the desktop cloud client to establish communication with the target virtual machine using the target virtual access gateway.

When the processor determines that no target virtual access gateway exists on the target computing node, the processor determines a target virtual access gateway from a virtual access gateway cluster using an existing load balancing algorithm. In this way, the desktop cloud controller can select, as far as possible, a virtual access gateway located on a same computing node as the virtual machine accessed by the client. Therefore, cross-server (namely, cross-computing node) communication between VMs can be avoided to a maximum extent. This helps reduce east-west network traffic. In addition, because the virtual machine accessed by the client and the virtual access gateway are on the same computing node, even if the computing node on which the virtual access gateway is located encounters a fault, another computing node is not affected.

Further, the processor first deploys a virtual access gateway on a computing node. A deployment rule is that at least one virtual access gateway is deployed on each computing node.

In a possible design, the processor is further configured to determine, based on the target virtual machine specified in the access request, the target computing node on which the target virtual machine is located, and determine a plurality of computing nodes on which a plurality of virtual access gateways are located, and when the plurality of computing nodes include the target computing node, determine the target virtual access gateway deployed on the target computing node.

In a possible design, the processor is further configured to determine, based on the target virtual machine specified in the access request, the target computing node on which the target virtual machine is located, and find, from a plurality of first mapping relationships, the target virtual access gateway deployed on the target computing node, where the plurality of first mapping relationships record a plurality of virtual access gateways and a plurality of computing nodes on which the plurality of virtual access gateways are deployed, and one of the plurality of first mapping relationships records the target virtual access gateway and the target computing node on which the target virtual access gateway is deployed.

In a possible design, the processor is further configured to find, from a plurality of second mapping relationships, the target virtual access gateway corresponding to the target virtual machine, where a plurality of VMs correspond to a plurality of virtual access gateways in the plurality of second mapping relationships, a virtual machine and a virtual access gateway that correspond to each other in the plurality of second mapping relationships are deployed on a same computing node, and the target virtual machine corresponds to the target virtual access gateway in one of the plurality of second mapping relationships.

According to a fourth aspect, this application further provides a computer readable storage medium. The computer readable storage medium stores an instruction. When the instruction runs on a computer, the computer is enabled to implement the method provided in the first aspect or any design of the first aspect.

According to a fifth aspect, this application further provides a computer program product including an instruction. When the instruction runs on a computer, the computer is enabled to perform the data packet sending method in the foregoing aspects or possible implementations.

In the access method provided in the embodiments of this application, cross-server communication between VMs can be avoided to a maximum extent. This helps reduce east-west network traffic. In this way, if a virtual machine accessed by a client and a virtual access gateway are on a same computing node, even if the computing node on which the virtual access gateway is located encounters a fault, another computing node is not affected.

DESCRIPTION OF EMBODIMENTS

The following further describes in detail this application with reference to accompanying drawings.

Figure 1:
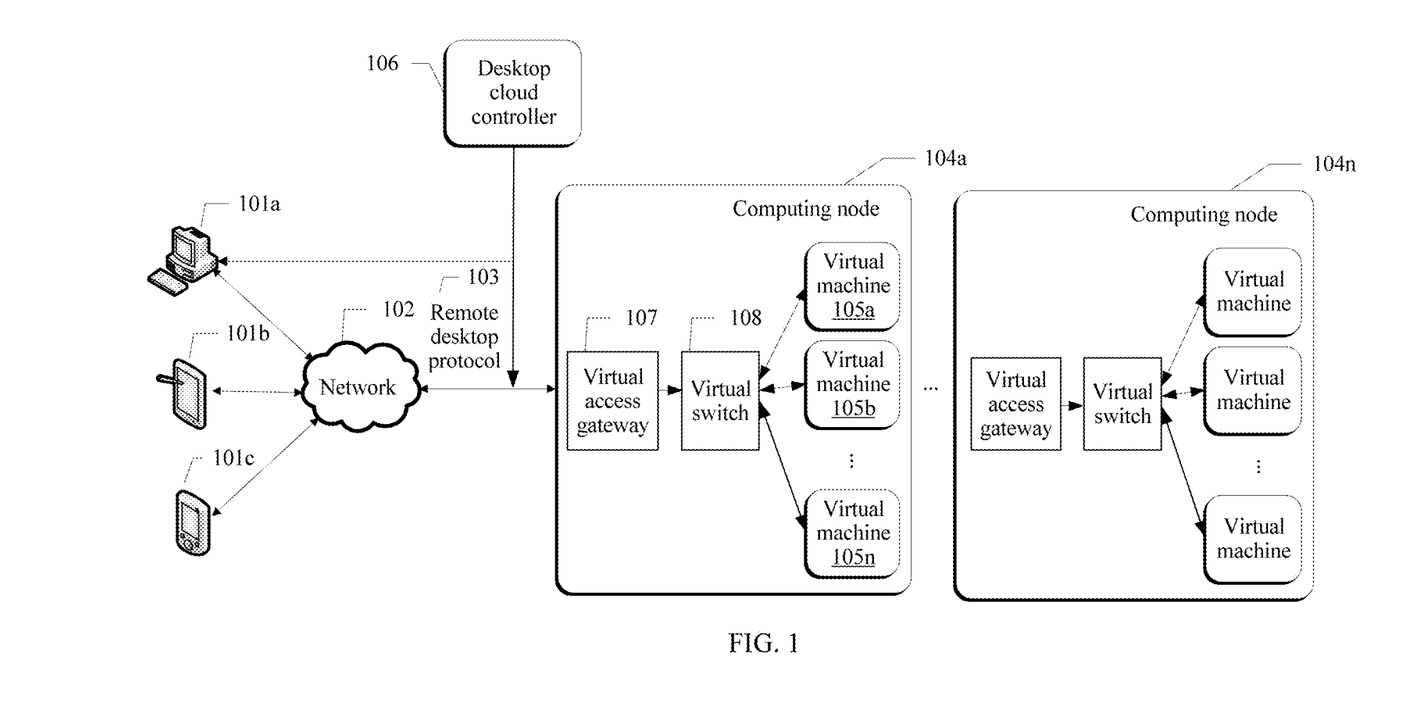
FIG. 1 is a schematic diagram 1 of a desktop cloud access system architecture according to an embodiment of this application.

A method for accessing a desktop cloud virtual machine in this application is applicable to a plurality of system architectures. FIG. 1 is a schematic diagram of a system architecture to which this application is applicable. The system architecture includes a client 101, a network 102, a remote desktop protocol 103, a computing node 104, a virtual machine 105, a desktop cloud controller 106, a virtual access gateway 107, and a virtual switch 108.

A client of a virtual desktop is on a left side in the figure, and is usually referred to as a thin client. A device form of the client may be a common computer 101*a*, a tablet computer 101*b*, a smartphone 101*c*, or the like. The thin client accesses a remote desktop service through the network 102 using the remote desktop protocol 103. A computing node 104*a* to a computing node 104*n* provide a remote desktop carrier. Virtual desktops (Virtual Desktop) of users exist on the computing node 104*a* to the computing node 104*n* in a form of a virtual machine (VM) 105*a*, a VM 105*b*, to a VM 105*n*.

In addition, the desktop cloud controller 106 is configured to provide a mapping relationship between a user and a virtual machine (a virtual machine instance is searched using a user name, in other words, after a user logs in, virtual machine instance information related to the user is obtained from the desktop cloud controller). The client is first connected to the desktop cloud controller 106 to obtain a virtual machine address of a user, and then is connected to a virtual machine. The desktop cloud controller 106 may be a server, a personal computer, or the like. The desktop cloud controller 106 may alternatively be a VM. This is not specifically limited in this embodiment of this application. The user accesses, using the client, the virtual machine (namely, a virtual desktop) allocated to the user. The virtual machine transmits, using the remote desktop protocol, content accessed by the user to the client of the user for display.

The virtual access gateway (VAG) 107 in FIG. 1 is located on the computing node. Each computing node may accommodate one or more VAGs, to connect a user access network to a service network in order to encrypt and protect access of the client, thereby improving system security. Further, secure sockets layer (SSL) encryption is performed on a data flow generated when the client accesses a desktop cloud system using the VAG. In this way, system security can be improved. In addition, the client 101 is connected to an IP address on the virtual access gateway 107, and an IP address of the virtual desktop does not need to be exposed to the client 101. In this way, an IP address segment of the virtual desktop and an IP address segment of the client may be separately constructed for isolation, thereby improving security of a data area on the virtual desktop.

The virtual switch 108 in FIG. 1 is located on the computing node. Each computing node may accommodate one or more virtual switches. A virtual switch and a virtual machine are created and run at a virtual layer on each server, and the virtual layer implements virtualization and scheduling of a physical resource on the server for use by one or more VMs. Each virtual switch is implemented using software running on the computing node. The virtual switch 108 may implement communication between a plurality of VMs on the computing node.

In the prior art, in actual deployment of a desktop cloud system, because a processing capability of a single VAG has a bottleneck, a quantity of supported virtual desktops is limited, and a plurality of VAGs usually need to be deployed to form a cluster. However, currently, a VAG cluster deployment manner is relatively random. A VAG and a virtual desktop VM may be deployed on a same host, or may not be deployed on a same host. In addition, a load balancing technology based on a round robin algorithm, a weighted round robin algorithm, a randomized algorithm, a least connection algorithm, a source hash algorithm, or another general algorithm is currently used for the VAG cluster. Therefore, the following problems may be easily caused in a working process.

1. Because the VAG cluster uses the general load balancing technology, although a specific load balancing effect can be achieved, cross-server (namely, cross-computing node) communication occurs between a VAG and a large quantity of VMs, resulting in heavy east-west network traffic. In addition, south-north network traffic is heavy. When the east-west traffic and the south-north traffic converge, a physical network interface card of a server on which the VAG is located easily becomes a bottleneck, and therefore, a capability externally provided by the VAG greatly weakens.

2. If the server on which the VAG is located encounters a fault, an impact area is relatively large and uncontrollable. The VAG and a VM on the server on which the VAG is located cannot normally provide services due to the fault of the server, and a virtual desktop that is on another server and that is externally providing a service depending on the VAG is affected.

3. A manner of upgrading a hardware configuration of the server on which the VAG is located or the like is used to deal with the bottleneck of the physical network interface card of the server. For example, a GE network interface card of the server is replaced with a 10 GE network interface card, and an SRIOV feature is enabled. In these cases, an environment needs to be reconstructed or created. Therefore, deployment is complex, costs greatly increase, and efficiency of the original common server is not fully exploited.

Figure 2:
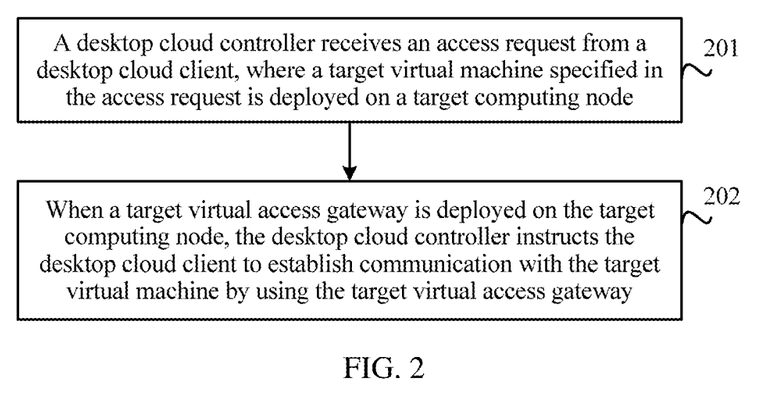
FIG. 2 is a schematic flowchart of a method for accessing a desktop cloud virtual machine according to an embodiment of this application.

Based on the foregoing reasons, an embodiment of this application provides a method for accessing a desktop cloud virtual machine. The method is performed by a desktop cloud controller. Specific steps are shown in FIG. 2.

Step 201. The desktop cloud controller receives an access request from a desktop cloud client, where a target virtual machine specified in the access request is deployed on a target computing node.

Step 202. When a target virtual access gateway is deployed on the target computing node, the desktop cloud controller instructs the desktop cloud client to establish communication with the target virtual machine using the target virtual access gateway.

In other words, the desktop cloud controller first parses the access request sent by the client to obtain information about the target virtual machine in the access request, and first determines whether a virtual access gateway exists on the computing node on which the target virtual machine is located. When the virtual access gateway exists, the desktop cloud controller sends information about the virtual access gateway to the client, and the client accesses the virtual machine using the virtual access gateway. When the virtual access gateway does not exist, the desktop cloud controller determines a target virtual access gateway from a virtual access gateway cluster using an existing load balancing algorithm. In this way, the desktop cloud controller can select, as far as possible, a virtual access gateway located on a same computing node as the virtual machine accessed by the client. Therefore, cross-server (namely, cross-computing node) communication between VMs can be avoided to a maximum extent. This helps reduce the east-west network traffic. In addition, because the virtual machine accessed by the client and the virtual access gateway are on the same computing node, even if the computing node on which the virtual access gateway is located encounters a fault, another computing node is not affected.

Optionally, before the foregoing steps are performed, VAGs in a VAG cluster are first deployed in this embodiment of this application. A deployment principle is as follows. At least one virtual access gateway is deployed on each computing node, in other words, different virtual access gateways are distributed to different computing nodes as far as possible. After all VAG instances are created, if a virtualized platform has an anti-affinity mechanism, the mechanism is used for automatic scheduling to ensure that different VAG instances are distributed to different computing nodes, or if a virtualized platform has no anti-affinity mechanism, it is required to manually specify that different VAG instances run on different computing nodes.

For example, it is assumed that computing nodes run VAG instances and VM instances, there are M VAG instances, and there are N computing nodes. M may be greater than N, or may be less than or equal to N. The following three scenarios are separately used for description.

Scenario 1. If M is equal to N, each VAG only needs to be allocated to each computing node during configuration.

Scenario 2. If M is less than N but is close to N, cross-server communication exists between VMs on only a few computing nodes having no VAG and other VAGs (it should be noted that, not one VAG bears the VMs on the computing nodes having no VAG, but a plurality of VAGs separately bear the VMs on the computing nodes having no VAG).

Scenario 3. If M is far less than N, during configuration, in consideration of a load capability of a computing node, a VM preferably runs on a computing node having a VAG.

Therefore, to ensure that all VAG instances run on different computing nodes, a preferred deployment manner is usually to make M equal to or relatively close to N.

After the foregoing deployment is completed, the desktop cloud controller receives the access request. The desktop cloud controller first determines, based on the target virtual machine specified in the access request, the target computing node on which the target virtual machine is located, and then the desktop cloud controller may select a virtual access gateway from a configured virtual access gateway cluster as the target access gateway.

Different methods may be used for different cases. Further, according to a first aspect, when information about a computing node on which a VM instance runs can be obtained through an interface of a virtualized platform, information about a plurality of computing nodes on which a plurality of virtual access gateways are located may be first determined. When the computing nodes include the target computing node, a virtual access gateway on the target computing node may be used as the target virtual access gateway. Certainly, when there are a plurality of virtual access gateways on the target computing node, selection is performed in these virtual access gateways using a general load balancing algorithm.

Figure 3:
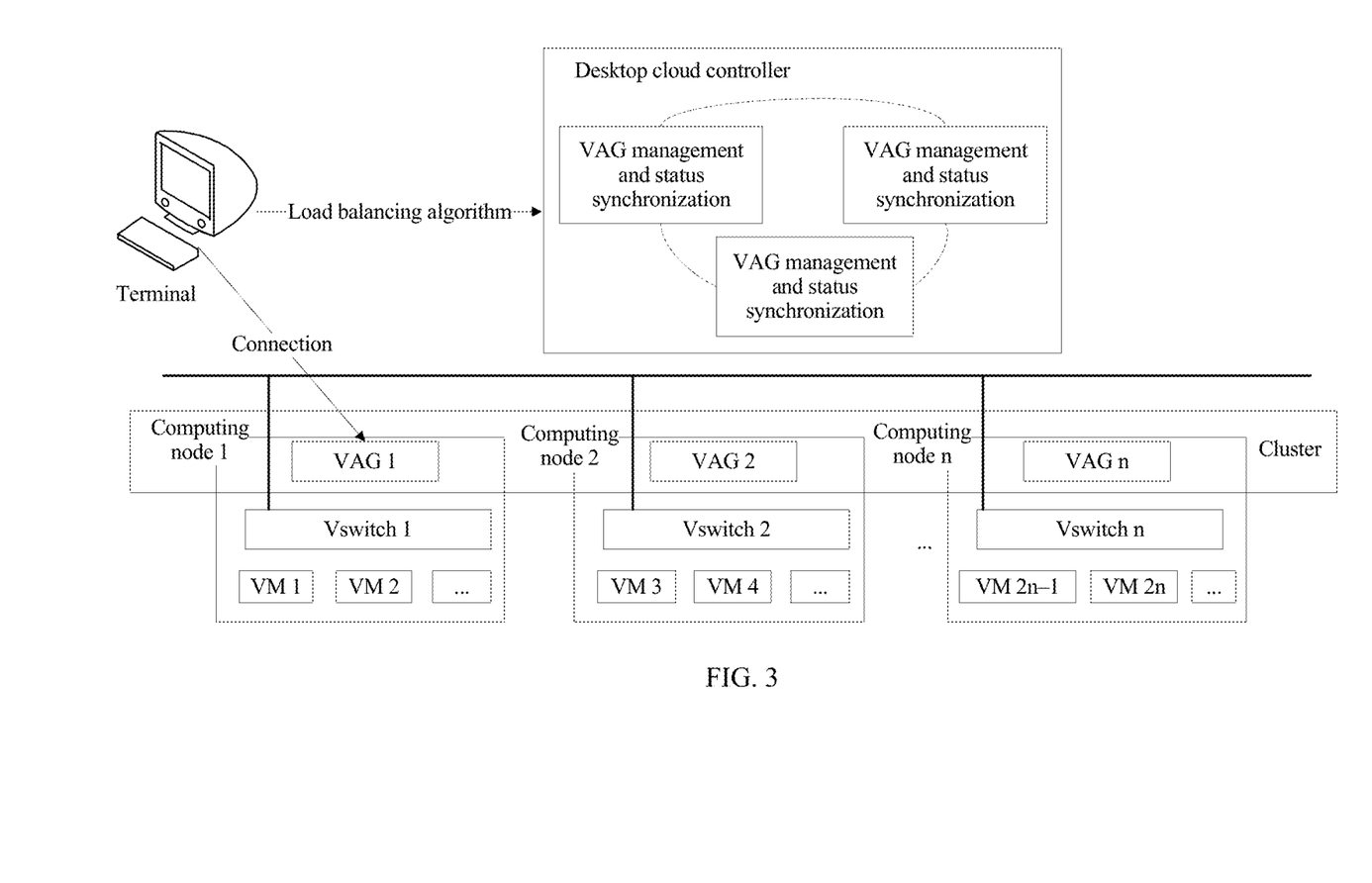
FIG. 3 is a schematic diagram 2 of a desktop cloud access system architecture according to an embodiment of this application.

According to a second aspect, if the virtualized cloud platform does not have the foregoing interface, information about a computing node on which a virtual access gateway is located cannot be obtained. In this case, a plurality of first mapping relationships may be preconfigured. These first mapping relationships record correspondences of all computing nodes with all VAGs. Any one of the first mapping relationships reflects the computing node and a VAG associated with the computing node. As shown in FIG. 3, for example, the plurality of first mapping relationships may be a first mapping relationship between a VAG 1 and a computing node 1, a first mapping relationship between a VAG 2 and a computing node 2, a first mapping relationship between a VAG 3 and a computing node 3, and a first mapping relationship between a VAG n and a computing node n. Therefore, the n first mapping relationships reflect correspondences between the computing node 1 to the computing node n and the VAG 1 to the VAG n. In this way, the desktop cloud controller may first determine, based on the target virtual machine specified in the access request, the target computing node on which the target virtual machine is located, and then find, from a first mapping relationship of the target computing node, the target virtual access gateway deployed on the target computing node.

According to a third aspect, if the virtualized cloud platform does not have the foregoing interface, a plurality of second mapping relationships may be preconfigured. These second mapping relationships record correspondences of all VMs with all VAGs. Any one of the second mapping relationships reflects a VAG associated with the VM. As shown in FIG. 3, for example, the plurality of second mapping relationships may be a second mapping relationship between a VAG 1 and both a VM 1 and a VM 2, a second mapping relationship between a VAG 2 and both a VM 3 and a VM 4, a second mapping relationship between a VAG 3 and both a VM 5 and a VM 6, and the like. Therefore, these second mapping relationships reflect correspondences between the VAG 1 to a VAG n and the VM 1 to a VM n. In this way, the desktop cloud controller can directly find a virtual access gateway corresponding to the target virtual machine, and use the found and determined virtual access gateway as the target virtual access gateway.

For example, as shown in FIG. 3, it is assumed that a user operates the client to choose to log in to a virtual desktop 2, namely, the VM 2, with which the user registers. In this case, the client sends an access request to the desktop cloud controller, and the access request includes information about the VM 2. Then, the desktop cloud controller may determine a VAG using the foregoing method. For example, it is first determined that an ID of a computing node on which the VM 2 is located is 1, and then IDs of computing nodes on which all normally used VAGs are located are obtained through the interface. Because an ID of a computing node on which the VAG 1 is located is the same as the ID of the computing node on which the VM 2 is located, it is determined that the VAG 1 is the target virtual access gateway. The desktop cloud controller feeds back connection parameter information of the VAG 1 to the client such that the client can access the VM 2 on the computing node 1 using the VAG 1.

Certainly, if there is no interface, the desktop cloud controller may first determine that the ID of the computing node on which the VM 2 is located is 1, then query a pre-established first mapping relationship between the computing node 1 and a VAG on the computing node 1, and determine that the VAG 1 is the target virtual access gateway. Alternatively, the desktop cloud controller directly queries a second mapping relationship between a VM and a VAG, finds the VAG 1 corresponding to the VM 2, and determines that the VAG 1 is the target virtual access gateway.

It can be learned that, after an employee chooses, using a client, to log in to a virtual desktop, a desktop cloud controller is triggered to interact with an access and access control layer, to determine a VAG instance according to a specified rule. Then, the desktop cloud controller transmits, to the client, information such as an address of the VAG and a to-be-used virtual desktop instance. The client extracts the address of the VAG, and is connected to and communicates with the VAG using a remote desktop protocol (such as an HDP desktop protocol). After the connection succeeds, connection interaction with a virtual machine to which the user logs in is established. Finally, the client accesses the VM using the VAG instance. In the access method provided in this embodiment of this application, cross-server communication between VMs can be avoided to a maximum extent. This helps reduce east-west network traffic. In this way, if a virtual machine accessed by a client and a virtual access gateway are on a same computing node, even if the computing node on which the virtual access gateway is located encounters a fault, another computing node is not affected.

Figure 4:
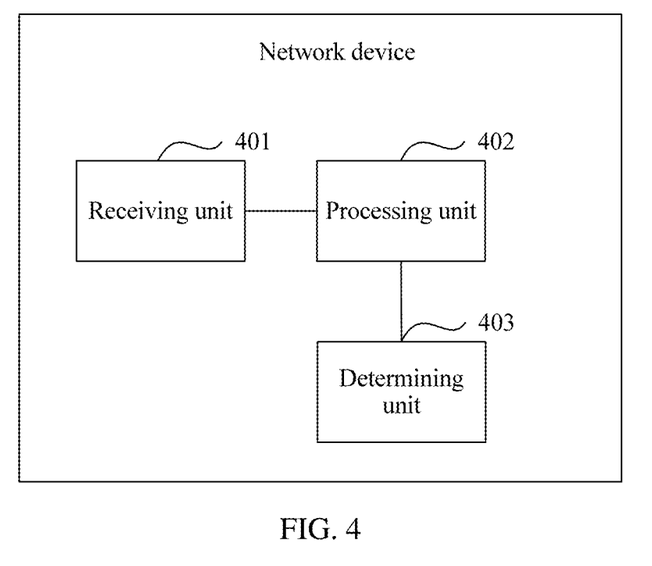
FIG. 4 is a schematic structural diagram of an apparatus for accessing a desktop cloud virtual machine according to an embodiment of this application.

For the foregoing method procedure, this application provides an apparatus for accessing a desktop cloud virtual machine. The apparatus may be integrated into a desktop controller. For specific execution content, refer to the foregoing method implementation. FIG. 4 is a schematic structural diagram of an apparatus for accessing a desktop cloud virtual machine according to an embodiment of this application. The apparatus includes a receiving unit 401, a processing unit 402, and a determining unit 403.

The receiving unit 401 is configured to receive an access request from a desktop cloud client, where a target virtual machine specified in the access request is deployed on a target computing node.

The processing unit 402 is configured to, when a target virtual access gateway is deployed on the target computing node, instruct the desktop cloud client to establish communication with the target virtual machine using the target virtual access gateway.

Before the receiving unit 401 receives the access request from the desktop cloud client, a virtual access gateway needs to be deployed. A deployment principle is that at least one virtual access gateway is deployed on each target computing node.

In a possible design, the apparatus further includes the determining unit 403 configured to determine, based on the target virtual machine specified in the access request, the target computing node on which the target virtual machine is located, determine a plurality of computing nodes on which a plurality of virtual access gateways are located, and when the plurality of computing nodes include the target computing node, determine the target virtual access gateway deployed on the target computing node. Certainly, if a plurality of virtual access gateways are deployed on the target computing node, an unused virtual access gateway is selected as far as possible.

In another possible design, the determining unit 403 is configured to determine, based on the target virtual machine specified in the access request, the target computing node on which the target virtual machine is located, and find, from a plurality of first mapping relationships, the target virtual access gateway deployed on the target computing node, where the plurality of first mapping relationships record a plurality of virtual access gateways and a plurality of computing nodes on which the plurality of virtual access gateways are deployed, and one of the plurality of first mapping relationships records the target virtual access gateway and the target computing node on which the target virtual access gateway is deployed.

Alternatively, in another possible design, the determining unit 403 is configured to find, from a plurality of second mapping relationships, the target virtual access gateway corresponding to the target virtual machine, where a plurality of VMs correspond to a plurality of virtual access gateways in the plurality of second mapping relationships, a virtual machine and a virtual access gateway that correspond to each other in the plurality of second mapping relationships are deployed on a same computing node, and the target virtual machine corresponds to the target virtual access gateway in one of the plurality of second mapping relationships.

In addition, when no virtual access gateway is deployed on the target computing node, the determining unit 403 is configured to determine the target virtual access gateway from a plurality of virtual access gateways based on a load balancing algorithm.

Figure 5:
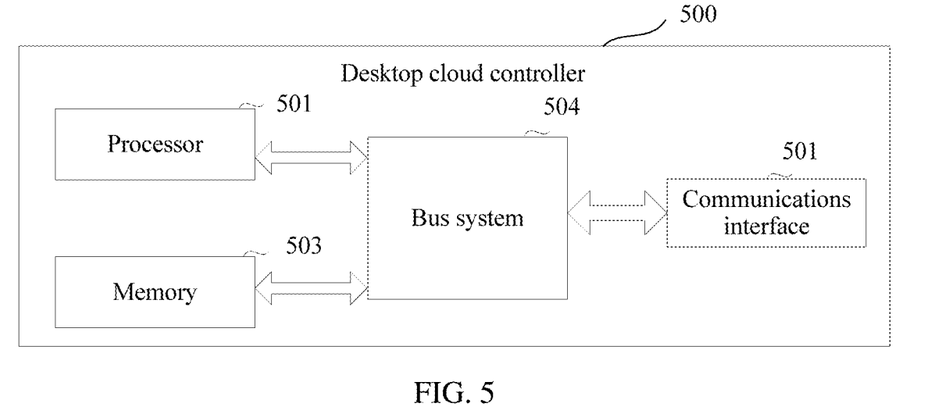
FIG. 5 is a schematic structural diagram of a desktop cloud controller according to an embodiment of this application.

FIG. 5 is a schematic structural diagram of a desktop cloud controller according to an embodiment of this application. The network device includes a communications interface 501, a processor 502, a memory 503, and a bus system 504.

The memory 503 is configured to store a program. Further, the program may include program code, and the program code includes a computer operation instruction. The memory 503 may be a random access memory (RAM), or may be a non-volatile memory (NVM), for example, at least one magnetic disk memory. Only one memory is shown in the figure. Certainly, a plurality of memories may alternatively be set as required. The memory 503 may alternatively be a memory in the processor 502.

The memory 503 stores the following elements, an executable module or a data structure, a subset thereof, or an extended set thereof an operation instruction including various operation instructions and used to implement various operations, and an operating system including various system programs and used to implement various basic services and process hardware-based tasks.

The processor 502 controls an operation of the desktop cloud controller 500, and the processor 502 may alternatively be referred to as a central processing unit (CPU). In specific application, all components of the desktop cloud controller 500 are coupled together using the bus system 504. The bus system 504 may include a power bus, a control bus, a status signal bus, and the like in addition to a data bus. However, for clear description, various buses in the figure are marked as the bus system 504. For ease of representation, only illustrative depiction is provided in FIG. 5.

The methods disclosed in the embodiments of this application may be applied to the processor 502 or may be implemented by the processor 502. The processor 502 may be an integrated circuit chip and has a signal processing capability. In an implementation process, steps in the foregoing methods may be implemented using a hardware integrated logical circuit in the processor 502, or using instructions in a form of software. The processor 502 may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor 502 may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly performed and accomplished by a hardware decoding processor, or may be performed and accomplished using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 503. The processor 502 reads information in the memory 503 and performs the steps of the foregoing methods in combination with hardware of the processor 502.

It can be learned from the foregoing content that, in the method for accessing a desktop cloud virtual machine that is provided in the embodiments of this application, cross-server communication between VMs can be avoided to a maximum extent. This helps reduce east-west network traffic. In this way, if a virtual machine accessed by a client and a virtual access gateway are on a same computing node, even if the computing node on which the virtual access gateway is located encounters a fault, another computing node is not affected.

An embodiment of the present application further provides a computer readable storage medium. The computer readable storage medium stores an instruction. When the instruction runs on a computer, the computer is enabled to implement the foregoing method for accessing a desktop cloud virtual machine.

An embodiment of the present application further provides a computer program product that includes an instruction. When the computer program product runs on a computer, the computer can implement the foregoing method for accessing a desktop cloud virtual machine.

A person skilled in the art should understand that the embodiments of the present application may be provided as a method, a system, or a computer program product. Therefore, the embodiments of the present application may use a form of hardware only embodiments, software only embodiments, or embodiments with a combination of software and hardware. In addition, the embodiments of the present application may use a form of a computer program product that is implemented on one or more computer-usable storage media (including but not limited to a disk memory, a CD-ROM, an optical memory, and the like) that include computer-usable program code.

The embodiments of the present application are described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Apparently, a person skilled in the art can make various modifications and variations to embodiments of the present application without departing from the spirit and scope of this application. In this way, this application is intended to cover these modifications and variations provided that they fall within the scope of protection defined by the following claims in this application and their equivalent technologies.

What is claimed is:

1. A method for accessing a desktop cloud virtual machine, comprising:
   receiving an access request from a desktop cloud client, wherein a target virtual machine specified in the access request is deployed on a target computing node;
   instructing the desktop cloud client to establish communication with the target virtual machine using a target virtual access gateway when the target virtual access gateway is deployed on the target computing node; and
   determining the target virtual access gateway from a plurality of virtual access gateways based on a load balancing algorithm when no virtual access gateway is deployed on the target computing node.

2. The method of claim 1, wherein before instructing the desktop cloud client to establish communication with the target virtual machine using the target virtual access gateway, the method further comprises:
   determining the target computing node on which the target virtual machine is located based on the target virtual machine specified in the access request;
   determining a plurality of computing nodes on which the plurality of virtual access gateways is located; and
   determining the target virtual access gateway deployed on the target computing node when the plurality of computing nodes comprise the target computing node.

3. The method of claim 1, wherein before instructing the desktop cloud client to establish communication with the target virtual machine using the target virtual access gateway, the method further comprises:
   determining the target computing node on which the target virtual machine is located based on the target virtual machine specified in the access request; and
   finding the target virtual access gateway deployed on the target computing node from a plurality of first mapping relationships, wherein the plurality of first mapping relationships record the plurality of virtual access gateways and a plurality of computing nodes on which the virtual access gateways are deployed, and wherein one of the plurality of first mapping relationships records the target virtual access gateway and the target computing node on which the target virtual access gateway is deployed.

4. The method of claim 1, wherein before instructing the desktop cloud client to establish communication with the target virtual machine using the target virtual access gateway, the method further comprises finding the target virtual access gateway of the target virtual machine from a plurality of second mapping relationships, wherein a plurality of virtual machines correspond to the plurality of virtual access gateways in the second mapping relationships, wherein a virtual machine and a virtual access gateway that correspond to each other in the second mapping relationships are deployed on a same computing node, and wherein the target virtual machine corresponds to the target virtual access gateway in one of the second mapping relationships.

5. The method of claim 1, wherein different virtual access gateways in the plurality of virtual access gateways are deployed on different computing nodes, wherein the virtual access gateways comprise the target virtual access gateway, and wherein the target virtual access gateway is deployed on the target computing node.

6. The method of claim 1, wherein the method further comprises:
  determining that at least one virtual access gateway is deployed on the target computing node from a virtual access gateway cluster, wherein the plurality of virtual access gateways comprised in the virtual access gateway cluster are deployed on at least one computing node, and wherein the at least one computing node comprises the target computing node; and
  determining one of the at least one virtual access gateway as the target virtual access gateway.

7. A desktop cloud controller, comprising
a processor; and
a memory, wherein the processor executes instructions stored in the memory to cause the desktop cloud controller to be configured to:
  receive an access request from a desktop cloud client, wherein a target virtual machine specified in the access request is deployed on a target computing node;
  instruct the desktop cloud client to establish communication with the target virtual machine using a target virtual access gateway when the target virtual access gateway is deployed on the target computing node; and
  determine the target virtual access gateway from a plurality of virtual access gateways based on a load balancing algorithm when no virtual access gateway is deployed on the target computing node.

8. The desktop cloud controller of claim 7, wherein the instructions further cause the desktop cloud controller to be configured to:
  determine the target computing node on which the target virtual machine is located based on the target virtual machine specified in the access request;
  determine a plurality of computing nodes on which the plurality of virtual access gateways are located; and
  determine the target virtual access gateway deployed on the target computing node when the computing nodes comprise the target computing node.

9. The desktop cloud controller of claim 8, wherein the instructions further cause the desktop cloud controller to be configured to:
  determine the target computing node on which the target virtual machine is located based on the target virtual machine specified in the access request; and
  find the target virtual access gateway deployed on the target computing node from a plurality of first mapping relationships, wherein the plurality of first mapping relationships record the plurality of virtual access gateways and a plurality of computing nodes on which the virtual access gateways are deployed, and one of the plurality of first mapping relationships records the target virtual access gateway and the target computing node on which the target virtual access gateway is deployed.

10. The desktop cloud controller of claim 7, wherein the instructions further cause the desktop cloud controller to be configured to find the target virtual access gateway of the target virtual machine from a plurality of second mapping relationships, and wherein a plurality of virtual machines correspond to the plurality of virtual access gateways in the second mapping relationships, a virtual machine and a virtual access gateway that correspond to each other in the second mapping relationships are deployed on a same computing node, and the target virtual machine corresponds to the target virtual access gateway in one of the second mapping relationships.

11. The desktop cloud controller of claim 7, wherein different virtual access gateways in the plurality of virtual access gateways are deployed on different computing nodes, wherein the virtual access gateways comprise the target virtual access gateway, and wherein the target virtual access gateway is deployed on the target computing node.

12. The desktop cloud controller of claim 7, wherein the instructions further cause the desktop cloud controller to be configured to:
  determine that at least one virtual access gateway is deployed on the target computing node from a virtual access gateway cluster, wherein the plurality of virtual access gateways comprised in the virtual access gateway cluster are deployed on at least one computing node, and wherein the at least one computing node comprises the target computing node; and
  determine one of the at least one virtual access gateway as the target virtual access gateway.

13. A computer program product comprising computer-executable instructions stored on a non-transitory computer-readable medium that, when executed by a processor, cause a desktop cloud controller to:
  receive an access request from a desktop cloud client, wherein a target virtual machine specified in the access request is deployed on a target computing node;
  instruct the desktop cloud client to establish communication with the target virtual machine using a target virtual access gateway when the target virtual access gateway is deployed on the target computing node; and
  determine the target virtual access gateway from a plurality of virtual access gateways based on a load balancing algorithm when no virtual access gateway is deployed on the target computing node.

14. The computer program product of claim 13, wherein the computer-executable instructions further cause the desktop cloud controller to be configured to:
  determine the target computing node on which the target virtual machine is located based on the target virtual machine specified in the access request;
  determine a plurality of computing nodes on which the plurality of virtual access gateways are located; and
  determine the target virtual access gateway deployed on the target computing node when the computing nodes comprise the target computing node.

15. The computer program product of claim 13, wherein the computer-executable instructions further cause the desktop cloud controller to be configured to:
  determine the target computing node on which the target virtual machine is located based on the target virtual machine specified in the access request; and
  find the target virtual access gateway deployed on the target computing node from a plurality of first mapping relationships, wherein the plurality of first mapping relationships record the plurality of virtual access gateways and a plurality of computing nodes on which the virtual access gateways are deployed, and one of the plurality of first mapping relationships records the target virtual access gateway and the target computing node on which the target virtual access gateway is deployed.

16. The computer program product of claim 13, wherein the computer-executable instructions further cause the desktop cloud controller to be configured to find the target virtual access gateway of the target virtual machine from a plurality of second mapping relationships, wherein a plurality of virtual machines correspond to the plurality of virtual access gateways in the second mapping relationships, wherein a virtual machine and a virtual access gateway that correspond to each other in the second mapping relationships are deployed on a same computing node, and wherein the target virtual machine corresponds to the target virtual access gateway in one of the second mapping relationships.

17. The computer program product of claim 13, wherein the computer-executable instructions further cause the desktop cloud controller to be configured to:

determine that at least one virtual access gateway is deployed on the target computing node from a virtual access gateway cluster, wherein the plurality of virtual access gateways comprised in the virtual access gateway cluster are deployed on at least one computing node, and wherein the at least one computing node comprises the target computing node; and determine one of the at least one virtual access gateway as the target virtual access gateway.

* * * * *

UNITED STATES PATENT AND TRADEMARK OFFICE
CERTIFICATE OF CORRECTION

| | |
|---|---|
| PATENT NO. | : 11,294,735 B2 |
| APPLICATION NO. | : 16/805255 |
| DATED | : April 5, 2022 |
| INVENTOR(S) | : Mingdeng Li |

It is certified that error appears in the above-identified patent and that said Letters Patent is hereby corrected as shown below:

In the Claims

Claim 9, Column 13, Line 52: "claim 8, wherein" should read "claim 7, wherein"

Signed and Sealed this
Thirty-first Day of May, 2022

Katherine Kelly Vidal
*Director of the United States Patent and Trademark Office*